United States Patent
Lee et al.

(10) Patent No.: US 9,730,229 B2
(45) Date of Patent: Aug. 8, 2017

(54) APPARATUS AND METHOD FOR MANAGING RESOURCE BETWEEN MACRO BASE STATION AND SMALL CELL BASE STATION IN MOBILE COMMUNICATION SYSTEM

(71) Applicant: Samsung Electronics Co., Ltd, Gyeonggi-do (KR)

(72) Inventors: Ok-Seon Lee, Gyeonggi-do (KR); Rakesh Taori, Gyeonggi-do (KR); Jung-Soo Jung, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 889 days.

(21) Appl. No.: 14/023,297

(22) Filed: Sep. 10, 2013

(65) Prior Publication Data

US 2014/0073331 A1    Mar. 13, 2014

(30) Foreign Application Priority Data

Sep. 10, 2012    (KR) .................. 10-2012-0099740

(51) Int. Cl.
*H04W 36/10*    (2009.01)
*H04W 72/04*    (2009.01)
*H04W 8/02*    (2009.01)
*H04W 16/32*    (2009.01)

(52) U.S. Cl.
CPC ........... *H04W 72/048* (2013.01); *H04W 8/02* (2013.01); *H04W 16/32* (2013.01)

(58) Field of Classification Search
CPC ............................ H04W 8/02; H04W 72/048
USPC .... 455/444, 452.1, 436, 449, 445, 443, 446, 455/437, 438, 439, 440, 441, 442, 450, 455/452.2
See application file for complete search history.

(56) References Cited

U.S. PATENT DOCUMENTS

2010/0113019 A1    5/2010    Jeong et al.

*Primary Examiner* — Temica M Beamer
*Assistant Examiner* — Sayed T Zewari

(57) ABSTRACT

A method for allocating a resource by a Mobile Station (MS) in a mobile communication system includes performing a measurement operation and a measurement report operation; and being allocated a resource from a small cell Base Station (BS) or a macro BS based on a neighbor small cell BS change probability and a neighbor small cell BS list, wherein the neighbor small cell BS list includes information on neighbor small cell BSs, and the neighbor small cell BSs are neighbor small cell BSs of which received signal strengths for reference signals measured by the MS are equal to or greater than a threshold received signal strength, and wherein the neighbor small cell BS change probability is determined using a neighbor small cell BS list which is generated at a current timing point and a neighbor small cell BS list which is generated at a previous timing point.

42 Claims, 7 Drawing Sheets

APPARATUS AND METHOD FOR MANAGING RESOURCE BETWEEN MACRO BASE STATION AND SMALL CELL BASE STATION IN MOBILE COMMUNICATION SYSTEM

PRIORITY

The present application is related to and claims the benefit under 35 U.S.C. §119(a) of a Korean Patent Application filed in the Korean Intellectual Property Office on Sep. 10, 2012 and assigned Serial No. 10-2012-0099740, the entire disclosure of which is hereby incorporated by reference.

TECHNICAL FIELD

The present disclosure generally relates to an apparatus and method for managing a resource between a macro Base Station (BS) and a small cell BS in a mobile communication system, and more particularly, to an apparatus and method for managing a resource between a macro BS and a small cell BS if a small cell BS is located within service coverage of a macro BS in a mobile communication system.

BACKGROUND

In a mobile communication system, various schemes such as a scheme of enhancing frequency efficiency for satisfying radio data traffic which rapidly increases and a scheme for using a high frequency band have been used. Further, in a mobile communication system, a small cell Base Station (BS) which has relatively small service coverage such as a pico-cell, a femto cell, a Local Access Network (LAN), etc. is additionally deployed for increasing total capability, and various schemes for maximizing usage of small cell BSs by distributing traffic of macro BSs to the small cell BSs have been used.

In a mobile communication system, there have been many efforts to solve a heavy increase for required data service quantity by deploying a concentrated and relatively large number of small cell BSs due to the heavy increase for the required data service quantity.

The small cell BS contributes to increase a total capacity of the mobile communication system at relatively low cost compared with a macro BS. The small cell BS should significantly consider a mobility and a Quality of Service (QoS) of a Mobile Station (MS) in order to provide a service to the MS. That is, if the mobility of the MS is relatively high, the MS may hand over to a specific small cell BS, and move out of service coverage of the specific small cell BS before being allocated a resource from the specific small cell BS. So, it is preferred to prevent a handover to a small cell BS of an MS with a relatively high mobility.

In a mobile communication system, a scheme in which a speed of an MS is measured by detecting a moving distance of the MS during a preset time using a Global Positioning System (GPS) has been proposed. However, this scheme is only possible for a terrestrial environment, so the scheme is impossible to be applied to MSs which are located in a non-terrestrial environment such as a subway, a tunnel, etc.

In a mobile communication system, a scheme in which a mobility of a related MS is predicted by counting handover times of the MS during preset time has been proposed. However, this scheme predicts the mobility of the related MS by considering only a macro BS, so it is impossible to predict the mobility of the related MS located within service coverage of one of a plurality of small cell BSs if the plurality of small cell BSs are densely located within service coverage of the macro BS.

So, there is a need for effectively managing a resource in a mobile communication system by considering a mobility of an MS which is detected by considering a situation on which a plurality of small cell BSs are located within service coverage of a macro BS.

The above information is presented as background information only to assist with an understanding of the present disclosure. No determination has been made, and no assertion or admission is made, as to whether any of the above might be applicable as prior art with regard to the present application.

SUMMARY

To address the above-discussed deficiencies of the related art, it is a primary object to provide an apparatus and method for managing a resource between a macro BS and a small cell BS in a mobile communication system.

The present application discloses an apparatus and method for managing a resource between a macro BS and a small cell BS if a small cell BS is located within service coverage of a macro BS in a mobile communication system.

The present application discloses an apparatus and method for managing a resource between a macro BS and a small cell BS by considering a mobility of an MS in a mobile communication system.

The present application discloses an apparatus and method for managing a resource between a macro BS and a small cell BS in a mobile communication system thereby enabling to minimize handover times of an MS.

The present application discloses an apparatus and method for managing a resource between a macro BS and a small cell BS in a mobile communication system by mainly allocating a resource of a small cell BS to an MS which is preferred to receive a service from a small cell BS.

In accordance with the present disclosure, there is provided a method for being allocated a resource by a Mobile Station (MS) in a mobile communication system, the method comprising: performing a measurement operation and a measurement report operation; and receiving a resource allocation from one of a small cell Base Station (BS) and a macro BS based on a neighbor small cell BS change probability and a neighbor small cell BS list, wherein the neighbor small cell BS list includes information on neighbor small cell BSs, and the neighbor small cell BSs are small cell BSs for which reference signals received by the MS have a signal strength measured by the MS equal to or greater than a threshold received signal strength, and wherein the neighbor small cell BS change probability is determined using a neighbor small cell BS list which is generated at a current timing point and a neighbor small cell BS list which is generated at a previous timing point.

In accordance with the present disclosure, there is provided a method for allocating a resource by a macro Base Station (BS) in a mobile communication system, the method comprising: upon detecting that there is a need for data distribution, determining first Mobile Stations (MSs) which are located at a range within which the first MSs can receive a service from a small cell BS based on measurement result information received from the MSs; detecting a neighbor small cell BS change probability per each of the first MSs; determining second MSs which can receive the service from the small cell BS based on the neighbor small cell BS change probability and a small cell BS suitable MS condition;

determining handover MSs based on a data distribution quantity after allocating priorities to the second MSs based on the neighbor small cell BS change probability; and transmitting a handover command message to the handover MSs in order for the handover MSs to be allocated resources from the macro BS and other BSs.

In accordance with the present disclosure, there is provided a method for allocating a resource by a small cell Base Station (BS) in a mobile communication system, the method comprising: allocating a priority per a related service flow of each Mobile Station (MS) based on a priority corresponding to a Quality of Service (QoS); when there are service flows with the same priority, allocating a priority higher than a priority for the rest of the service flows to service flows for MSs for which neighbor small cell BS change probability is small; and allocating a resource to related service flows based on the allocated priority.

In accordance with the present disclosure, there is provided a Mobile Station (MS) in a mobile communication system, the MS comprising: a controller configured to perform a measurement operation and a measurement report operation, and receive a resource allocation from one of a small cell Base Station (BS) and a macro BS based on a neighbor small cell BS change probability and a neighbor small cell BS list, wherein the neighbor small cell BS list includes information on neighbor small cell BSs, and the neighbor small cell BSs are small cell BSs for which reference signals received by the MS have a signal strength measured by the MS equal to or greater than a threshold received signal strength, and wherein the neighbor small cell BS change probability is determined using a neighbor small cell BS list which is generated at a current timing point and a neighbor small cell BS list which is generated at a previous timing point.

In accordance with the present disclosure, there is provided a macro Base Station (BS) in a mobile communication system, the macro BS comprising: a controller configured to determine first Mobile Stations (MSs) which are located at a range within which the first MSs can receive a service from a small cell BS based on measurement result information received from MSs upon detecting that there is a need for data distribution, detecting a neighbor small cell BS change probability per each of the first MSs, determining second MSs which can receive the service from the small cell BS based on the neighbor small cell BS change probability and a small cell BS suitable MS condition, and determining handover MSs based on data distribution quantity after allocating priorities to the second MSs based on the neighbor small cell BS change probability; and a transmitter configured to transmit a handover command message to the handover MSs in order for the handover MSs to be allocated resources from the macro BS and other BSs.

In accordance with the present disclosure, there is provided a small cell Base Station (BS) in a mobile communication system, the small cell BS comprising: a controller having a memory configured to: allocate a priority per a related service flow of each Mobile Station (MS) based on a priority corresponding to a Quality of Service (QoS), allocate a priority higher than a priority for the rest service flows to service flows for MSs of which neighbor small cell BS change probability is small when there are service flows with the same priority, and allocate a resource to related service flows based on the allocated priority.

Other aspects, advantages, and salient features of the disclosure will become apparent to those skilled in the art from the following detailed description, which, taken in conjunction with the annexed drawings, discloses exemplary embodiments of the application.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
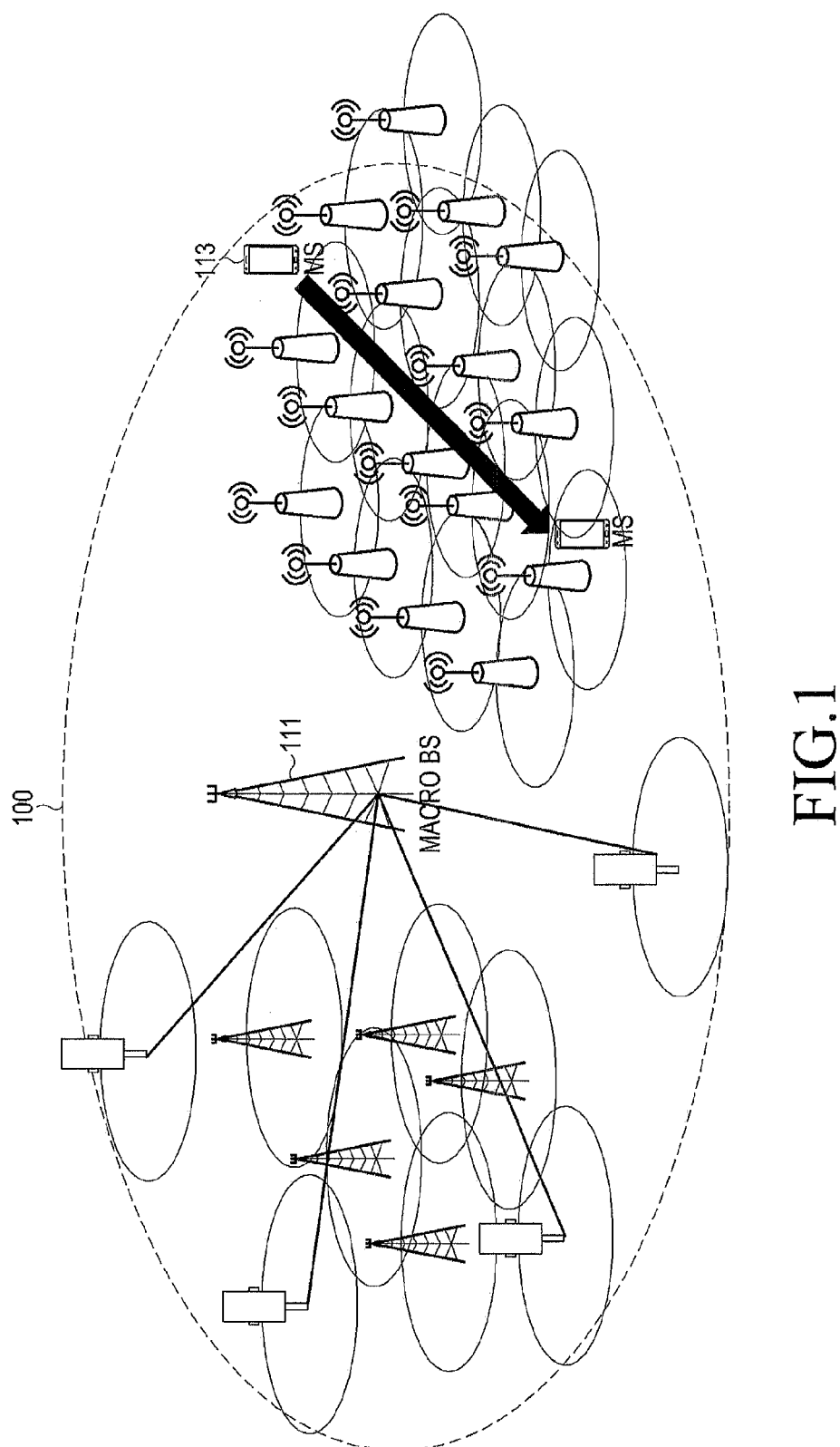
FIG. 1 schematically illustrates a structure of a mobile communication system according to certain embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. As the present invention allows for various changes and numerous embodiments, particular embodiments will be illustrated in the drawings and described in detail. However, the present invention is not limited to the specific embodiments and should be construed as including all changes, equivalents, and substitutions included in the spirit and scope of the present invention.

The present application discloses an apparatus and method for managing a resource between a macro Base Station (BS) and a small cell BS in a mobile communication system.

The present application discloses an apparatus and method for managing a resource between a macro BS and a small cell BS if a small cell BS is located within service coverage of a macro BS in a mobile communication system.

The present application discloses an apparatus and method for managing a resource between a macro BS and a small cell BS by considering a mobility of a Mobile Station (MS) in a mobile communication system.

The present application discloses an apparatus and method for managing a resource between a macro BS and a small cell BS in a mobile communication system thereby enabling minimization of handover times of an MS.

The present application discloses an apparatus and method for managing a resource between a macro BS and a small cell BS in a mobile communication system by mainly allocating a resource of a small cell BS to an MS which is preferred to receive a service from a small cell BS.

An apparatus and method proposed in the present disclosure can be applied to various mobile communication systems such as a Long-Term Evolution (LTE) mobile communication system, a Long-Term Evolution-Advanced (LTE-A) mobile communication system, an Institute of Electrical and Electronics Engineers (IEEE) 802.16m communication system, and a cloud cell communication system.

FIG. 1 schematically illustrates a structure of a mobile communication system according to certain embodiments of the present disclosure.

Referring to FIG. 1, the mobile communication system includes a macro BS 111, an MS 113, and a plurality of small cell BSs. Service coverage of the macro BS 111 includes a service coverage of each of the plurality of small cell BSs. For example, the service coverage of each of the plurality of small cell BSs can be classified as one of a pico cell, Wireless-Fidelity (Wi-Fi) cell, a femto cell, a Remote Radio Header (RRH) header, a Wireless Local Access Network (WLAN) with a specific IDentifier (ID) such as a physical cell ID, a BS ID, a beam ID, a RRH ID, etc.

The MS 113 performs a measurement operation and a measurement result report operation for neighbor cells under control of the macro BS 111, and the measurement operation and the measurement result report operation can be performed according to a need of the macro BS 111 or can be periodically performed. The measurement operation for the neighbor cells denotes an operation in which the MS 113 measures received signal strength such as a Signal to Interference and Noise Ratio (SINR), a Signal to Noise Ratio (SNR), a Received Signal Strength Indicator (RSSI), a Channel Quality indicator (CQI), etc. for reference signals such as pilot signals transmitted from the neighbor cells. The measurement result report operation denotes an operation in which the MS 113 transmits a measurement operation performance result to the macro BS 111, for example, the MS transmits a measurement result report message to the macro BS 111.

As illustrated in FIG. 1, if an MS 113 is located at a region in which small cell BSs are densely deployed, the MS 113 can detect relatively large neighbor small cell BSs upon performing a measurement operation, so the small cell BSs detected upon performing the measurement operation changes according to movement of the MS 113. If the MS 113 moves relatively fast, a detected neighbor small cell BS change probability becomes relatively large. On the other hand, if the MS 113 moves relatively slowly or does not move, a detected neighbor small cell BS change probability becomes relatively small or there is no detected neighbor small cell BS change probability.

So, the present disclosure proposes a method for detecting an MS which is preferred for receiving a service from a small cell BS using a neighbor small cell BS change probability.

Figure 2:
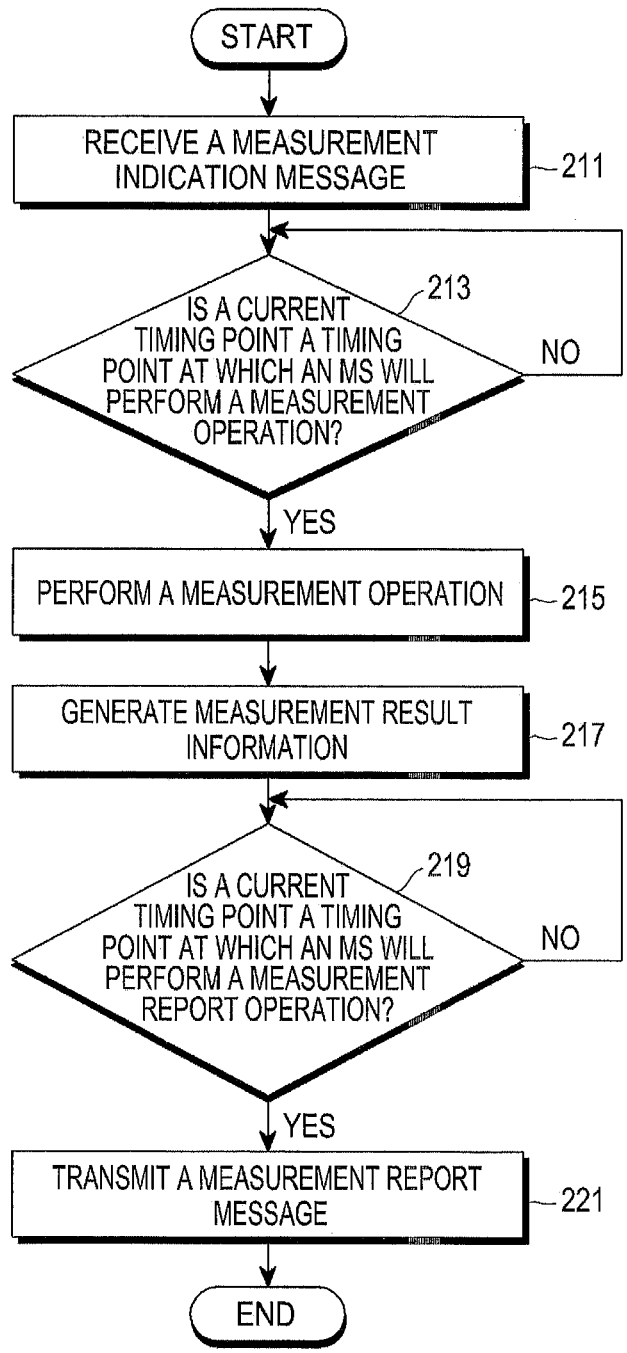
FIG. 2 schematically illustrates a process for generating a neighbor small cell BS list in order to detect a neighbor small cell BS change probability in an MS in a mobile communication system according to certain embodiments of the present disclosure.

FIG. 2 schematically illustrates a process for generating a neighbor small cell BS list in order to detect a neighbor small cell BS change probability in an MS in a mobile communication system according to certain embodiments of the present disclosure.

Referring to FIG. 2, an MS receives a measurement indication message form a serving BS in step 211. The measurement indication message includes following parameters.

(1) Measurement Timing Information:

The MS should perform a measurement operation in order to transmit a measurement report message to the serving BS, the measurement timing information denotes information on a timing point at which the MS will perform the measurement operation. The measurement timing information includes period information denoting information on a period by which the MS will perform the measurement operation if the MS is required to periodically perform the measurement operation, and the measurement timing information includes measurement operation performance condition information if the MS is required to perform the measurement operation according to an event occurrence. For example, the measurement operation performance condition information can include measurement operation performance condition information #1 as measurement operation performance condition information denoting that the MS should perform the measurement operation upon receiving a measurement indication message from the serving BS, measurement operation performance condition information #2 as measurement operation performance condition information denoting that the MS should perform the measurement operation upon satisfying a preset handover condition or a cell reselection condition, etc.

(2) Criterion for Neighbor Small Cell BSs Corresponding to Neighbor Small Cell BS IDs Included in a Neighbor Small Cell BS List:

The MS should generate a neighbor small cell BS list in order to detect a neighbor small cell BS change probability, and neighbor small cell BS IDs included in the neighbor small cell BS list are neighbor small cell BS IDs of neighbor small cell BSs which have reference signal received signal strength measured in the MS which are equal to or greater than a preset threshold received signal strength.

For example, the threshold received signal strength can be set to one of (1) received signal strength which is necessary for providing a minimum service in a small cell BS, (2) received signal strength which is necessary for satisfying data rate which the MS requires in a related small cell BS type, and (3) received signal strength which the MS can detect.

Firstly, if the threshold received signal strength is set to the received signal strength which is necessary for providing the minimum service in the small cell BS, a plurality of neighbor small cell BS list are generated per each small cell BS type, and a neighbor small cell BS change probability is calculated per each small cell BS type.

Secondly, if the threshold received signal strength is set to the received signal strength which is necessary for satisfying the rate which the MS requires in the related small cell BS type, a plurality of neighbor small cell BS list are generated per each small cell BS type, and a neighbor small cell BS change probability is calculated per each small cell BS type.

Thirdly, if the threshold received signal strength is set to the received signal strength which the MS can detect, one neighbor small cell BS list is generated regardless of a small cell BS type, and one neighbor small cell BS change probability is generated regardless of the small cell BS type.

If the neighbor small cell BS list should be generated per each small cell BS type, a type of a related small cell BS should be identified, the type of the related small cell BS can be identified using System Information (SI) which the related small cell BS broadcasts or a frequency band which the related small cell BS uses.

(3) Measurement Result Information:

The measurement result information is information indicating measurement operation performance result which should be included in a measurement report message which the MS should transmit, and includes at least one of a neighbor small cell. BS change probability, a small cell BS service indicator indicating whether a related MS is suitable for receiving a service form a related small cell BS, and a neighbor small cell BS list.

(4) Measurement Report Timing Point Information:

The measurement report timing point information denotes a timing point at which an MS should perform a measurement report operation, i.e., the MS should transmit a measurement report message, and includes period information if a periodic measurement report message transmission is required. On the other hand, the measurement report timing point information includes measurement report operation performance criterion information if an event based measurement report message transmission is required. For example, the measurement report operation performance criterion information can include first measurement report operation performance criterion information indicating that the MS should perform a measurement report operation upon receiving a measurement report message transmission request message from the serving BS, second measurement report operation performance criterion information indicating that the MS should perform a measurement report operation upon satisfying a preset measurement report operation performance criterion, etc.

The MS determines whether a current timing point is a timing point at which the MS will perform a measurement operation in step 213. The MS can detect that the MS should perform a measurement operation based on the measurement timing point information, i.e., period information or measurement operation performance criterion information. The MS performs a measurement operation for each of neighbor small cell BSs in step 215. The MS generates measurement result information based on the measurement operation performance result in step 217. The measurement result information includes at least one of a neighbor small cell BS change capability, a small cell BS service indicator indicating whether a related MS is suitable for receiving a service form a related small cell BS, and a neighbor small cell BS list.

The MS determines whether a current timing point is a timing point at which the MS will perform a measurement report operation in step 219. If the current timing point is the timing point at which the MS will perform the measurement report operation, the MS transmits a measurement report message including the generated measurement result information to the serving BS in step 221.

As described above, the measurement result information includes the at least one of the neighbor small cell BS change probability, the small cell BS service indicator indicating whether the related MS is suitable for receiving the service from the small cell BS, the neighbor small cell BS list, etc. A more particular description follows.

The neighbor small cell BS change probability is calculated by an MS or a serving BS. If the MS calculates the neighbor small cell BS change probability, the MS reports the calculated neighbor small cell BS change probability to the serving BS. On the other hand, if the serving BS calculates the neighbor small cell BS change probability, the serving BS calculates the neighbor small cell BS change probability using the neighbor cell BS list per each measurement report timing point transmitted in the MS.

The neighbor small cell BS change probability is calculated per small cell BS type or one neighbor small cell BS change probability is calculated according to a scheme according to which a threshold received signal strength is set. If the threshold received signal strength is set to a received signal strength which is necessary for a small cell. BS to provide a minimum service or a received signal strength which is necessary for satisfying data rate of an MS for a related small cell BS type, the neighbor small cell BS change probability is calculated per small cell BS type. On the other hand, if the threshold received signal strength is set to a received signal strength which the MS can detect, one neighbor small cell BS change probability is calculated regardless of the small cell BS type. A scheme for calculating the neighbor small cell BS change probability will be descried below, so a detailed description will be omitted herein.

As described above, the measurement report information can include the small cell BS service indicator indicating whether the related MS is suitable for receiving the service form the related small cell BS. The related MS determines whether the related MS is suitable for receiving the service form the related small cell BS according to whether a preset small cell BS suitable MS condition is satisfied, and sets a value of the small cell BS service indicator based on the determined result. Here, whether the related MS is suitable for receiving the service form the related small cell BS can be determined per the small cell BS type or regardless of the small cell BS type.

If whether the related MS is suitable for receiving the service form the related small cell BS is determined per the small cell BS type, the related MS can be suitable for receiving the service from a small cell BS of which type is a specific type and can be unsuitable for receiving the service from a small cell BS of which type is other type different from the specific type. So, the specific small cell BS can determine whether the specific small cell BS will provide the service to the related MS using this result. For example, it can be determined that the related MS operates a 5 gigahertz frequency band and is suitable for receiving a service from a small cell BS with a 100 m radius although it is determined that the related MS operates in the tens of gigahertz frequency band and is not suitable for receiving a service from a small cell BS with a 10 m radius. A detailed description of the small cell BS suitable MS condition will be described below.

The neighbor small cell BS change probability is calculated using one of three schemes expressed in Equations (1) to (3).

$$\text{neighbor small cell } BS \text{ change probability} = 1 - \frac{A}{B} \quad (1)$$

Where, A denotes the number of previous neighbor small cell BS IDs included in a current neighbor small cell BS list, and B denotes the number of neighbor small cell BS IDs included in a previous neighbor small cell BS list. The previous neighbor small cell BS IDs denote neighbor small cell BS IDs included in the previous neighbor small cell BS list.

$$\text{neighbor small cell } BS \text{ change probability} = \frac{C+D}{E+F-G} \quad (2)$$

Where, C denotes the number of neighbor small cell BS IDs which are newly included in a current neighbor small cell BS list, D denotes the number of neighbor small cell BS IDs which are not included in the current neighbor small cell BS list among neighbor small cell BS IDs included in a previous small cell BS list, E denotes the number of the neighbor small cell BS IDs included in the previous small cell BS list, F denotes the number of the neighbor small cell BS IDs included in the current small cell BS list, G denotes the number of neighbor small cell BS IDs which are commonly included in the previous small cell BS list and the current small cell BS list, that is, which are overlapped in the previous small cell BS list and the current small cell BS list.

$$\text{neighbor small cell } BS \text{ change probability} = \frac{H+I}{J} \quad (3)$$

Where, H denotes the number of neighbor small cell BS IDs which are not included in a previous neighbor small cell BS list and are included in a current neighbor small cell BS list, I denotes the number of neighbor small cell BS IDs which are not included in the current neighbor small cell BS list among the neighbor small cell BS IDs included in the previous neighbor small cell BS list, and J denotes the number of neighbor small cell BS IDs included in a neighbor small cell BS list during a preset time interval. Here, H, I, and J can be calculated per small cell BS type, or can be calculated regardless of the small cell BS type.

However, it will be understood by those of ordinary skill in the art that the neighbor small cell BS change probability can be calculated with various forms as well as Equations (1) to (3). For example, the neighbor small cell BS change probability can be calculated as an average value of neighbor small cell BS change probabilities calculated in a preset time interval.

The small cell BS suitable MS condition can be expressed as $$\text{CONDITION} = (1-K) \times \left( \frac{\alpha \times L + \beta \times M + \gamma \times N}{P} \right) \times (Q) \geq 1 \quad (4)$$

where, CONDITION denotes the small cell BS suitable MS condition, K denotes the neighbor small cell BS change probability, L denotes handover time, M denotes a scheduling period, N denotes running time, P denotes a neighbor small cell BS change probability comparing interval, Q denotes a number of average neighbor small cell BS IDs included in the neighbor small cell BS list, and each of α, β, γ is a margin.

The small cell BS suitable MS condition expressed in Equation (4) is used for determining whether a related MS can be located within service coverage of a small cell BS and be allocated a resource at least one time. If the small cell BS suitable MS condition is satisfied, the related MS is determined as an MS which is suitable for receiving a service from the small cell BS.

The small cell BS suitable MS condition expressed in Equation (4) can be calculated and reported to a serving BS by an MS. On the other hand, the small cell BS suitable MS condition expressed in Equation (4) can calculated using a neighbor small cell BS list or a neighbor small cell BS change probability per measurement report timing point transmitted by the MS.

Figure 3:
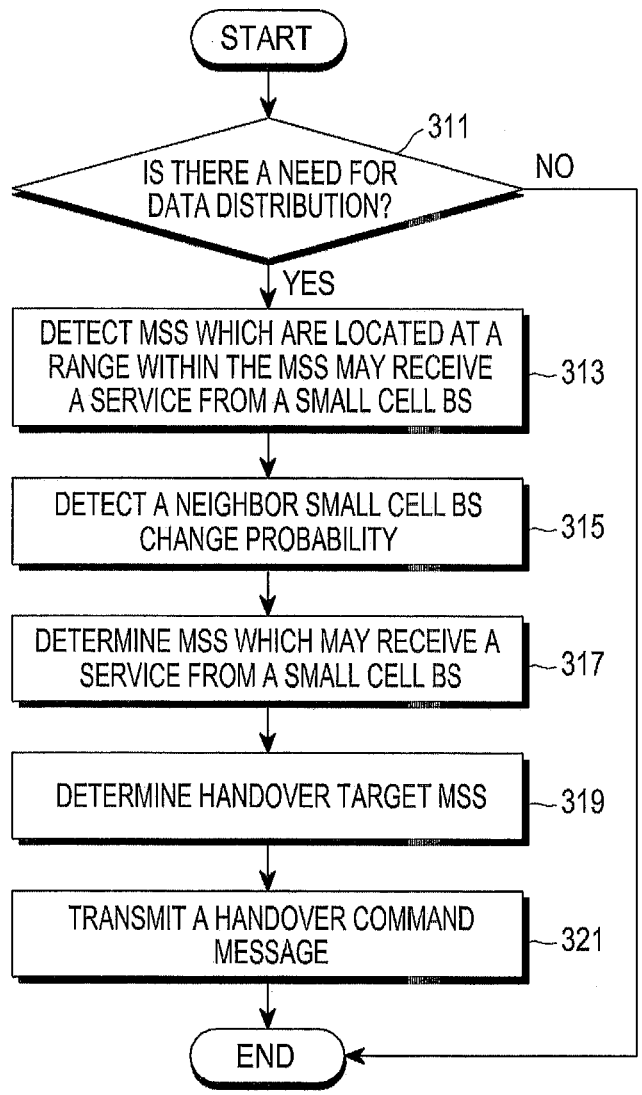
FIG. 3 schematically illustrates a process for control an MS to perform a handover operation with a small cell BS according to a need for data distribution in a macro BS in a mobile communication system according to certain embodiments of the present disclosure.

FIG. 3 schematically illustrates a process for control an MS to perform a handover operation with a small cell BS according to a need for data distribution in a macro BS in a mobile communication system according to certain embodiments of the present disclosure.

Prior to description of FIG. 3, a handover operation is initiated by an MS if the MS satisfies a general handover condition in which received signal strength of a reference signal which the MS receives form a serving BS is larger or equal to received signal strength of a reference signal which the MS receives form a target BS as a threshold value during preset time. However, the handover operation can be initiated by a macro BS if the macro BS determines a need of a handover for the MS in order to distribute load of the macro BS, or increase a resource efficiency of a small cell BS, or satisfy a resource allocation level which the MS requires even though the MS does not satisfy the general handover condition.

Referring to FIG. 3, the macro BS determines whether there is a need for data distribution in step 311. For example, the macro BS can determine that there is the need for the data distribution if a load of the macro BS is equal to or greater than a preset threshold load, or resource allocation quantity per each MS does not satisfies required resource quantity per each MS. If there is the need for the data distribution, the macro BS detects MSs which are located at a range within the MSs can receive a service from a small cell BS in step 313. Here, the macro BS can detect MSs which have received signal strength of reference signal received from a specific small cell BS larger than or equal to threshold received signal strength as the MSs which are located at the range within the MSs can receive the service from the small cell BS using a measurement result report message transmitted by each MS.

The macro BS detects a neighbor small cell BS change probability for MSs which are located at a range within which the MSs can receive a service from the small cell BS in step 315. The neighbor small cell BS change probability has been described above. The macro BS determines MSs which can receive a service from a small cell BS using the detected neighbor small cell BS change probability and a small cell BS suitable MS condition for the MSs which are located at the range within which the MSs can receive the service from the small cell BS in step 317. However, it will be understood by those of ordinary skill in the art that the neighbor small cell BS change probability can be detected per small cell BS type, so the macro BS can detect MSs which can receive a service from a small cell BS corresponding to a related small cell BS type if the neighbor small cell BS change probability is detected per small cell BS type. The macro BS determines a preset number of handover target MSs by allocating priorities to MSs in decreasing order of a neighbor small cell BS change capability in step 319. Here, the preset number corresponds to target data distribution quantity. That is, the macro BS accumulates data quantity for MSs in decreasing order of priorities of the MSs, and excludes MSs of low priorities from the handover target MSs if the accumulated data quantity reaches the target data distribution quantity. Here, the target data distribution quantity can be calculated based on a sum of quantity which each MS requires. The macro BS transmits a handover command message to the detected handover target MSs in step 321.

Figure 4:
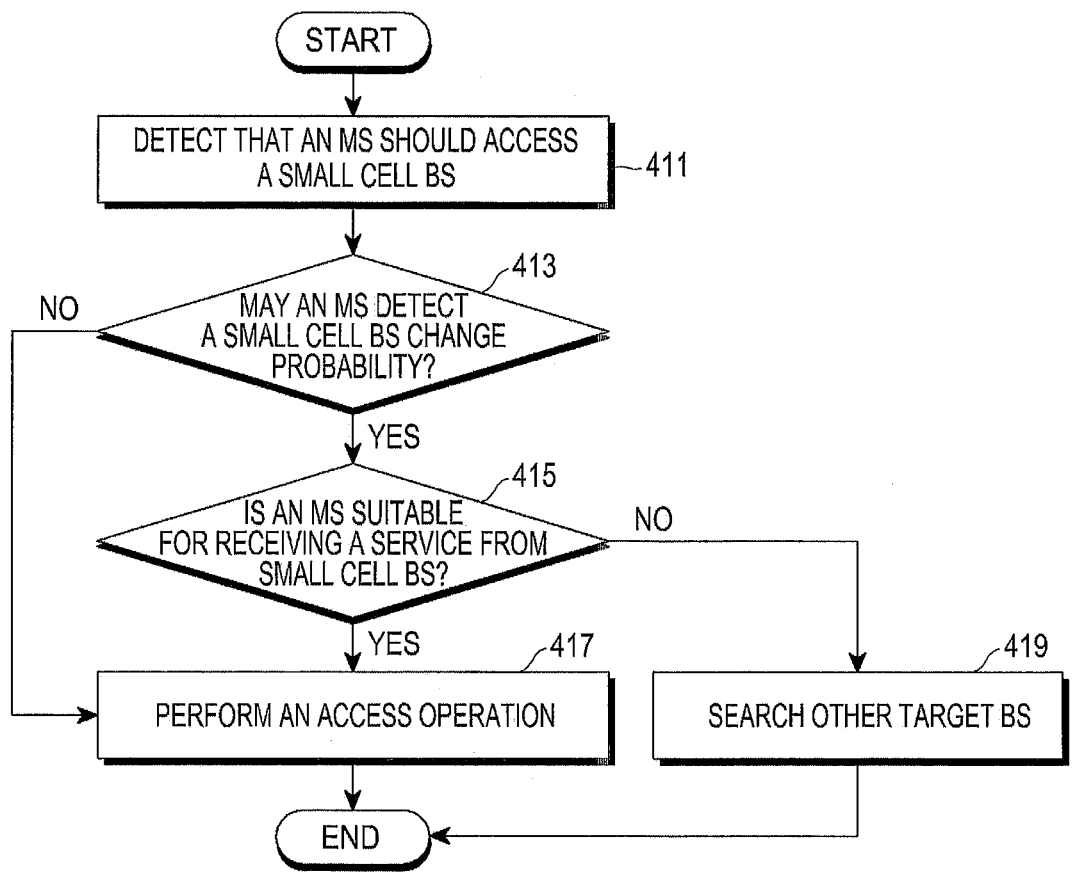
FIG. 4 schematically illustrates a process for performing an access operation with a small cell BS in an MS in a mobile communication system according to certain embodiments of the present disclosure.

FIG. 4 schematically illustrates a process for performing an access operation with a small cell BS in an MS in a mobile communication system according to certain embodiments of the present disclosure.

Referring to FIG. 4, the MS detects that the MS should access a small cell BS during detecting a new serving BS according to release of a connection with a serving BS in step 411. The MS determines whether the MS can detect a small cell BS change probability in step 413. Here, if the MS has a neighbor small cell BS list, the MS can detect the small cell BS change probability. The neighbor small cell BS list has been described above, so a detailed description will be omitted herein.

If the MS can detect the small cell BS change probability, the MS determines whether the MS is suitable for receiving a service from a small cell BS in step 415. Here, the MS determines whether the MS is suitable for receiving the service from the small cell BS using a small cell BS suitable MS condition. The small cell BS suitable MS condition has been described above. If the MS is suitable for receiving the service from the small cell BS, the MS performs an access operation with a related small cell BS in step 417.

If the MS is not suitable for receiving the service from the small cell BS, that is, the MS does not satisfy the small cell BS suitable MS condition, the MS searches other target BS in step 419. Further, if the MS cannot detect the small cell BS change probability, the MS performs the access operation with the related small cell BS in step 417.

Figure 5:
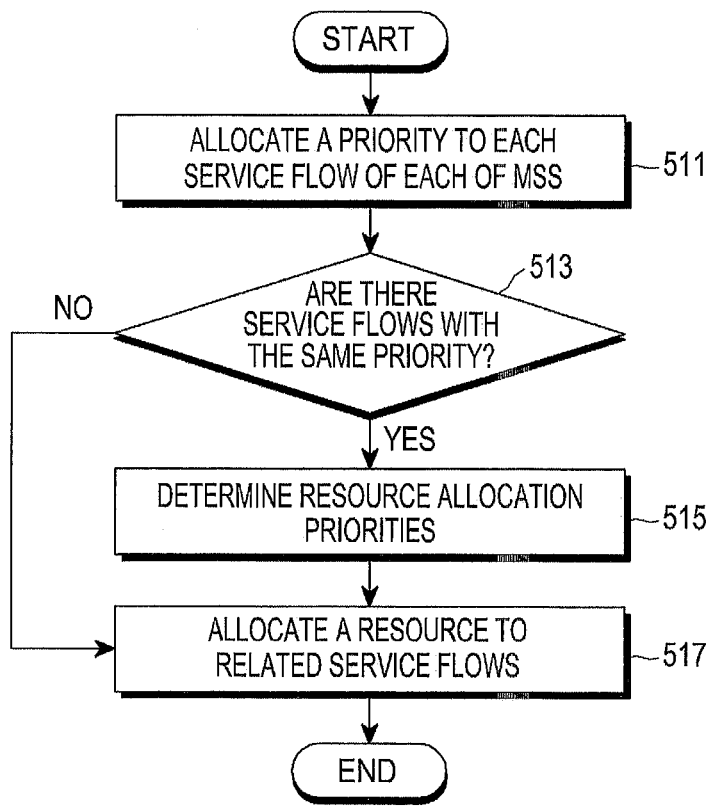
FIG. 5 schematically illustrates a process for allocating a resource in a small cell BS in a mobile communication system according to certain embodiments of the present disclosure.

FIG. 5 schematically illustrates a process for allocating a resource in a small cell BS in a mobile communication system according to certain embodiments of the present disclosure. Referring to FIG. 5, the small cell BS allocates a priority to each service flow of each of a plurality of MSs based on a priority corresponding to a Quality of Service (QoS) while the plurality of MSs receive a service from the small cell BS within service coverage of the small cell BS in step 511. For example, if a specific MS downloads a file using a File Transfer Protocol (FTP) service and receives a video streaming service, each of the FTP service and the video streaming service can be regarded as one service flow, so the video streaming service as a real-time service has a priority higher than a priority of the FTP service as a non real-time service in view of a priority corresponding to a QoS.

The small cell BS determines whether there are service flows with the same priority in step 513. If there are the service flows with the same priority, the small cell BS detects a neighbor small cell BS change probability of a related MS for each of the service flows with the same priority, and determines resource allocation priorities to the service flows with the same priority based on an order of the detected neighbor small cell BS change probabilities in step 515. Here, the smaller a neighbor small cell BS change probability is, the higher priority allocated to a service flow is. The small cell BS allocates a resource to related service flows based on the determined resource allocation priority in step 517.

Figure 6:
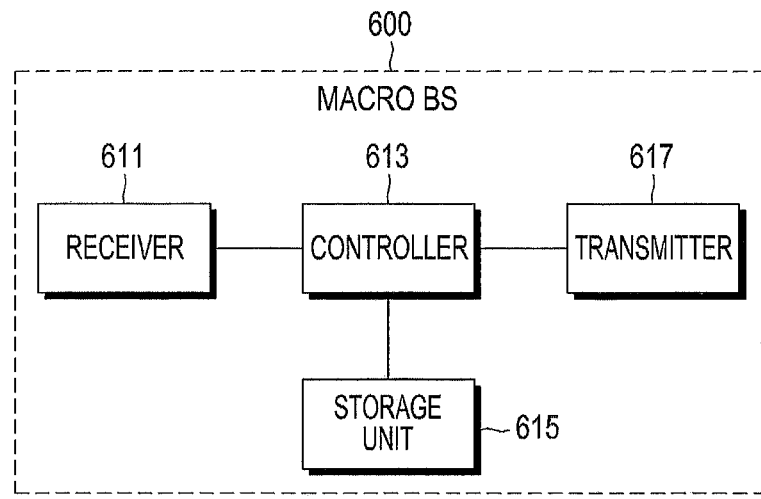
FIG. 6 schematically illustrates an internal structure of a macro BS in a mobile communication system according to certain embodiments of the present disclosure.

FIG. 6 schematically illustrates an internal structure of a macro BS in a mobile communication system according to certain embodiments of the present disclosure. Referring to FIG. 6, a macro BS 600 includes a receiver 611, a controller 613, a storage unit 615, and a transmitter 617.

The controller 613 controls the overall operation of the macro BS 600. In particular, the controller 613 controls the macro BS 600 to control handover operation performances of MSs according to various reasons such as a need of data distribution, etc. and provide communication services to the MSs by cooperating with small cell BSs. The operation related to controlling the handover operation performances of MSs and providing the communication services to the MSs is performed in the manner described before with reference to FIGS. 2 to 5, so a detailed description thereof will be omitted herein.

The receiver 611 receives messages from small cell BSs, MSs, etc. under control of the controller 613. The storage unit 615 stores the messages received in the receiver 611, and a program and data related to the operation of the macro BS 600. The transmitter 617 transmits messages to small cell BSs, MSs, etc. under control of the controller 613.

While the receiver 611, the controller 613, the storage unit 615, and the transmitter 617 are shown in FIG. 6 as separate units, it is to be understood that this is for merely convenience of description. In other words, two or more of the receiver 611, the controller 613, the storage unit 615, and the transmitter 617 can be incorporated into a single unit.

Figure 7:
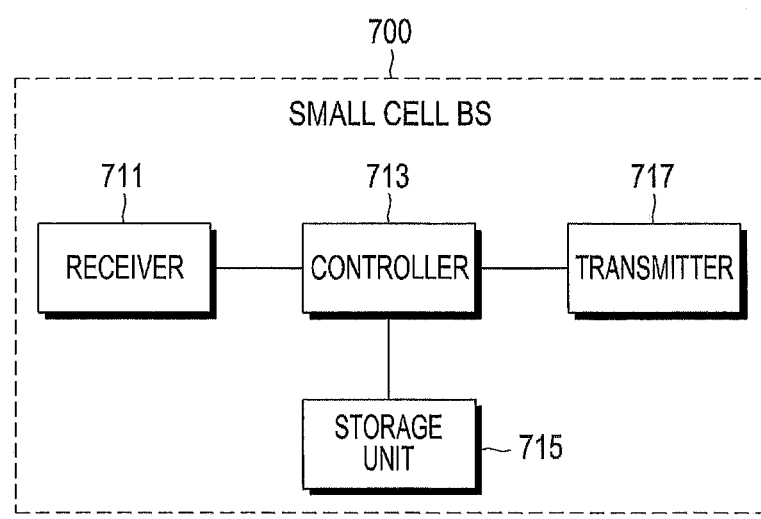
FIG. 7 schematically illustrates an internal structure of a small cell BS in a mobile communication system according to certain embodiments of the present disclosure.

FIG. 7 schematically illustrates an internal structure of a small cell BS in a mobile communication system according to certain embodiments of the present disclosure. Referring to FIG. 7, a small cell BS 700 includes a receiver 711, a controller 713, a storage unit 715, and a transmitter 717.

The controller 713 controls the overall operation of the small cell BS 700. In particular, the controller 713 controls the small cell BS 700 to allocate resources based on priorities for MSs and services of the MSs and provide communication services to the MSs by cooperating with a macro BS. The operation related to allocating resources and providing the communication services to the MSs is performed in the manner described before with reference to FIGS. 2 to 5, so a detailed description thereof will be omitted herein. The receiver 711 receives messages from a macro BS, other small cell BSs, MSs, etc. under control of the controller 713. The storage unit 715 stores the messages received in the receiver 711, and a program and data related to the operation of the small cell BS 700. The transmitter 717 transmits messages to a macro BS, other small cell BSs, MSs, etc. under control of the controller 713.

While the receiver 711, the controller 713, the storage unit 715, and the transmitter 717 are shown in FIG. 7 as separate units, it is to be understood that this is for merely convenience of description. In other words, two or more of the receiver 711, the controller 713, the storage unit 715, and the transmitter 717 can be incorporated into a single unit.

Figure 8:
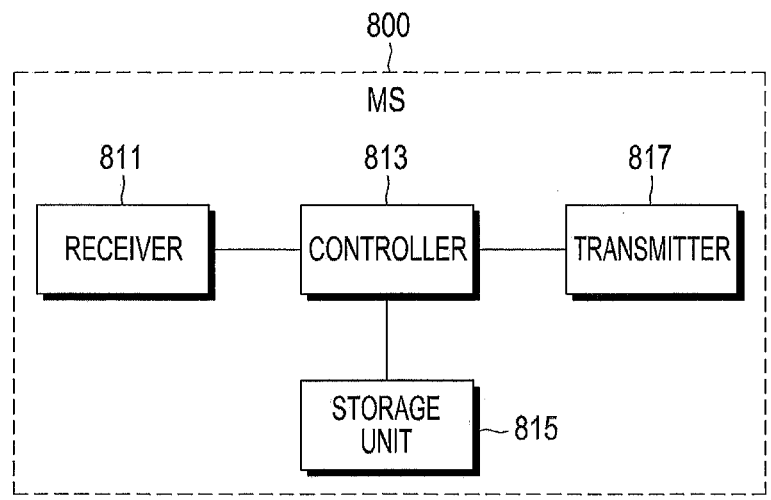
FIG. 8 schematically illustrates an internal structure of an MS in a mobile communication system according to certain embodiments of the present disclosure.

FIG. 8 schematically illustrates an internal structure of an MS in a mobile communication system according to certain embodiments of the present disclosure. Referring to FIG. 8, an MS 800 includes a receiver 811, a controller 813, a storage unit 815, and a transmitter 817.

The controller 813 controls the overall operation of the MS 800. In particular, the controller 813 controls the MS 800 to perform a measurement operation and a measurement report operation and receive a communication service by cooperating with a macro BS and small cell BSs. The operation related to performing the measurement operation and the measurement report operation and receiving the communication services is performed in the manner described before with reference to FIGS. 2 to 5.

The receiver 811 receives messages from a macro BS, small cell BSs, etc. under control of the controller 813. The storage unit 815 stores the messages received in the receiver 811, and a program and data related to the operation of the MS 800. The transmitter 817 transmits messages to a macro BS, small cell BSs, etc. under control of the controller 813. While the receiver 811, the controller 813, the storage unit 815, and the transmitter 817 are shown in FIG. 8 as separate units, it is to be understood that this is for merely convenience of description. In other words, two or more of the receiver 811, the controller 813, the storage unit 815, and the transmitter 817 can be incorporated into a single unit.

As is apparent from the foregoing description, the present disclosure enables to manage a resource between a macro BS and a small cell BS in a mobile communication system.

The present disclosure enables to manage a resource between a macro BS and a small cell BS if a small cell BS is located within service coverage of a macro BS in a mobile communication system. The present disclosure enables to manage a resource between a macro BS and a small cell BS by considering a mobility of an MS in a mobile communication system. The present disclosure enables to manage a resource between a macro BS and a small cell BS in a mobile communication system thereby enabling to minimize handover times of an MS. The present disclosure enables to manage a resource between a macro BS and a small cell BS in a mobile communication system by mainly allocating a resource of a small cell BS to an MS which is preferred to receive a service from a small cell BS.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A method for receiving resource allocation information by a mobile station (MS) in a mobile communication system, the method comprising:
    transmitting, to a first base station (BS), a measurement report including a neighbor second BS change probability and a neighbor second BS list; and
    receiving the resource allocation information from one of a second BS and the first BS based on the measurement report; and
    wherein the neighbor second BS list includes information on neighbor second BSs, and the neighbor second BSs are second BSs for which reference signals received by the MS have a signal strength measured by the MS equal to or greater than a threshold received signal strength, and
    wherein the neighbor second BS change probability is determined based on a neighbor second BS list generated at a first timing point and a neighbor second BS list generated at a second timing point, and the second timing point is a timing point before the first timing point.

2. The method of claim 1, wherein the threshold received signal strength is set to one of a received signal strength that is necessary for providing a minimum service in a second BS, a received signal strength that is necessary for satisfying a data rate that the MS requires based on a second BS type, and a received signal strength detectable by the MS.

3. The method of claim 1, wherein the neighbor second BS change probability is determined based on
    a number of second neighbor second BS identifiers (IDs) per each second BS type included in the neighbor second BS list generated at the first timing point and a number of neighbor second BS IDs per each second BS type included in the neighbor second BS list generated at the second timing point.

4. The method of claim 1, further comprising:
    detecting that the MS performs an access operation with the second BS according to release of a connection with the first BS during receiving a communication service based on the resource allocation information, if the resource allocation information is received from the first BS;
    determining whether a detection of the neighbor second BS change probability is possible;
    if the detection of the neighbor second BS change probability is possible, determining whether the MS is suitable for receiving a service from the second BS based on the neighbor second BS change probability; and
    if the MS is suitable for receiving the service from the second BS, performing the access operation with the second BS.

5. The method of claim 4, further comprising:
    if the detection of the neighbor second BS change probability is impossible, performing the access operation with the second BS.

6. The method of claim 4, further comprising:
    if the MS is unsuitable for receiving the service from the second BS, searching other target BS different from the second BS.

7. The method of claim 4, wherein the step of determining whether the MS is suitable for receiving the service from the second BS comprises:
    determining whether the MS satisfies a second BS suitable MS condition,
    wherein the second BS suitable MS condition is determined based on the neighbor second BS change probability, and at least one of handover time, a scheduling period, running time, a neighbor second BS change probability comparing interval, a number of average neighbor second BS IDs included in the neighbor second BS list, and a margin.

8. The method of claim 1, wherein the step of transmitting, to the first BS, the measurement report comprises:
    receiving a measurement indication message from the first BS; and
    transmitting, to the first BS, the measurement report,
    wherein the measurement indication message includes at least one of measurement timing point information, a condition for neighbor second BSs corresponding to neighbor second BS identifiers (IDs) included in the neighbor second BS list, measurement result information, and measurement report timing point information,
    wherein the measurement timing point information denotes information on a timing point at which the MS performs a measurement operation,
    wherein the condition for the neighbor second BSs corresponding to the neighbor second BS IDs included in the neighbor second BS list denotes neighbor second BSs that have received signal strengths equal to or greater than the threshold received signal strength, wherein the measurement result information comprises performance results of the measurement operation including that the MS transmits, and wherein the measurement report timing point information comprises information on a timing point at which the MS performs a measurement report operation.

9. The method of claim 8, wherein the performance results of the measurement operation includes at least one of the neighbor second BS change probability, a second BS service indicator indicating whether the MS is suitable for receiving a service from a second BS, and the second BS list.

10. A method for transmitting resource allocation information by a first base station (BS) in a mobile communication system, the method comprising:

receiving, from a mobile station (MS), a measurement report including a neighbor second BS change probability and a neighbor second BS list; and transmitting, to the MS, the resource allocation information based on the measurement report, wherein the neighbor second BS list includes information on neighbor second BSs, and the neighbor second BSs are second BSs for which reference signals received by the MS have a signal strength measured by the MS equal to or greater than a threshold received signal strength, and wherein the neighbor second BS change probability is determined based on a neighbor second BS list generated at a first timing point and a neighbor second BS list generated at a second timing point, and the second timing point is a timing point before the first timing point.

11. The method of claim 10, further comprising:

upon detecting that there is a need for data distribution, determining whether the MS is located at a range within which a reception of a service from a second BS is possible based on measurement result information received from the MS;

if the MS is located at the range, determining whether the MS is possible that the reception of the service from the second BS based on the neighbor second BS change probability and a second BS suitable MS condition; and if the MS is possible that the reception of the service from the second BS, transmitting, to the MS, a handover command message for a handover to the second BS, wherein the neighbor second BS change probability is used for determining a handover priority of the MS.

12. The method of claim 11, wherein the threshold received signal strength is set to one of a received signal strength that is necessary for providing a minimum service in a second BS, a received signal strength that is necessary for satisfying a data rate that the MS requires based on a second BS type, and a received signal strength detectable by the MS.

13. The method of claim 11, wherein the neighbor second BS change probability is determined based on a number of second neighbor second BS identifiers (IDs) per each second BS type included in the neighbor second BS list generated at the first timing point and a number of neighbor second BS IDs per each second BS type included in the neighbor second BS list generated at the second timing point.

14. The method of claim 11, wherein upon detecting that there is the need for the data distribution further comprises:

detecting that there is the need for the data distribution if a load of the first BS is equal to or greater than a threshold load or if a resource allocation quantity per an MS does not require a resource quantity per an MS.

15. The method of claim 11, wherein the second BS suitable MS condition is determined based on the neighbor second BS change probability, and at least one of handover time, a scheduling period, running time, a neighbor second BS change probability comparing interval, a number of average neighbor second BS IDs included in the neighbor second BS list, and a margin.

16. The method of claim 10, wherein the step of receiving, from the MS, the measurement report comprises:

transmitting a measurement indication message to the MS; and receiving, from the MS, the measurement report, wherein the measurement indication message includes at least one of measurement timing point information, a condition for neighbor second BSs corresponding to neighbor second BS identifiers (IDs) included in the neighbor second BS list, measurement result information, and measurement report timing point information, wherein the measurement timing point information denotes information on a timing point at which the MS performs a measurement operation, wherein the condition for the neighbor second BSs corresponding to the neighbor second BS IDs included in the neighbor second BS list denotes neighbor second BSs that have received signal strengths equal to or greater than the threshold received signal strength, wherein the measurement result information comprises performance results of a measurement operation including that the MS transmits, and wherein the measurement report timing point information comprises information on a timing point at which the MS performs a measurement report operation.

17. The method of claim 16, wherein the performance results of the measurement operation includes at least one of the neighbor second BS change probability, a second BS service indicator indicating whether the MS is suitable for receiving a service from a second BS, and the neighbor second BS list.

18. A method for transmitting resource allocation information by a second base station (BS) in a mobile communication system, the method comprising:

performing a handover operation to the second BS of a mobile station (MS); and transmitting, to the MS, the resource allocation information, wherein the handover operation is performed based on a neighbor second BS change probability and a neighbor second BS list, wherein the neighbor second BS list includes information on neighbor second BSs, and the neighbor second BSs are second BSs for which reference signals received by the MS have a signal strength measured by the MS equal to or greater than a threshold received signal strength, and wherein the neighbor second BS change probability is determined based on a neighbor second BS list generated at a first timing point and a neighbor second BS list generated at a second timing point, and the second timing point is a timing point before the first timing point.

19. The method of claim 18, wherein the step of transmitting, to the MS, the resource allocation information comprises:

transmitting, to the MS, the resource allocation information related to a service flow of the MS based on a first priority related to the service flow of the MS, the first priority is corresponding to a quality of service (QoS),
wherein if the first priority is identical to a second priority related to a service flow of the other MS, the first priority is set to have a higher priority than the second priority based on the neighbor second BS change probability of the MS and a neighbor second BS change probability of the other MS, and
wherein the neighbor second BS change probability of the MS is smaller than the neighbor second BS change probability of the other MS.

20. The method of claim 18, wherein the threshold received signal strength is set to one of a received signal strength that is necessary for providing a minimum service in a second BS, a received signal strength that is necessary for satisfying a data rate that the MS requires based on a second BS type, and a received signal strength that the MS can detect.

21. The method of claim 18, wherein the neighbor second BS change probability is determined based on
a number of second neighbor second BS identifiers (IDs) per each second BS type included in the neighbor second BS list generated at the first timing point and a number of neighbor second BS IDs per each second BS type included in the neighbor second BS list generated at the second timing point.

22. A mobile station (MS) in a mobile communication system, the MS comprising:
a transceiver configured to transmit, to a first base station (BS), a measurement report including a neighbor second BS change probability and a neighbor second BS list, and receive, from the first BS, resource allocation information from one of a second BS and the first BS based on the measurement report,
wherein the neighbor second BS list includes information on neighbor second BSs, and the neighbor second BSs are second BSs for which reference signals received by the MS have a signal strength measured by the MS equal to or greater than a threshold received signal strength, and
wherein the neighbor second BS change probability is determined based on a neighbor second BS list generated at a first timing point and a neighbor second BS list generated at a second timing point, and the second timing point is a timing point before the first timing point.

23. The MS of claim 22, wherein the threshold received signal strength is set to one of a received signal strength that is necessary for providing a minimum service in a second BS, a received signal strength that is necessary for satisfying a data rate that the MS requires based on a second BS type, and a received signal strength detectable by the MS.

24. The MS of claim 22, wherein the neighbor second BS change probability is determined based on
a number of second neighbor second BS identifiers (IDs) per each second BS type included in the neighbor second BS list generated at the first timing point and a number of neighbor second BS IDs per each second BS type included in the neighbor second BS list generated at the second timing point.

25. The MS of claim 22, further comprising a processor configured to:
detect that the MS performs an access operation with the second BS according to release of a connection with the first BS during receiving a communication service based on the resource allocation information, if the resource allocation information is received from the first BS;
determine whether a detection of the neighbor second BS change probability is possible, determine whether the MS is suitable for receiving a service from the second BS if the detection of the neighbor second BS change probability is possible based on the neighbor second BS change probability; and
perform the access operation with the second BS if the MS is suitable for receiving the service from the second BS.

26. The MS of claim 25, wherein the processor is further configured to perform the access operation with the second BS if the detection of the neighbor second BS change probability is impossible.

27. The MS of claim 25, wherein the processor is further configured to search other target BS different from the second BS if the MS is unsuitable for receiving the service from the second BS.

28. The MS of claim 25, wherein the processor is further configured to;
determine whether the MS satisfies a second BS suitable MS condition; and
wherein the second BS suitable MS condition is determined based on the neighbor second BS change probability, and at least one of handover time, a scheduling period, running time, a neighbor second BS change probability comparing interval, a number of average neighbor second BS IDs included in the neighbor second BS list, and a margin.

29. The MS of claim 22, wherein the transceiver is further configured to receive a measurement indication message from the first BS,
wherein the measurement indication message includes at least one of measurement timing point information, a condition for neighbor second BSs corresponding to neighbor second BS identifiers (IDs) included in the neighbor second BS list, measurement result information, and measurement report timing point information,
wherein the measurement timing point information denotes information on a timing point at which the MS performs a measurement operation,
wherein the condition for the neighbor second BSs corresponding to the neighbor second BS IDs included in the neighbor second BS list denotes neighbor second BSs that have received signal strengths equal to or greater than the threshold received signal strength,
wherein the measurement result information comprises performance results of a measurement operation including that the MS transmits, and
wherein the measurement report timing point information comprises information on a timing point at which the MS performs a measurement report operation.

30. The MS of claim 29, wherein the performance results of the measurement operation includes at least one of the neighbor second BS change probability, a second BS service indicator indicating whether the MS is suitable for receiving a service from a second BS, and the second BS list.

31. A first base station (BS) in a mobile communication system, the first BS comprising:
a transceiver configured to receive, from a mobile station (MS), a measurement report including a neighbor second BS change probability and a neighbor second BS list, and transmit, to the MS, resource allocation information based on the measurement report, wherein the neighbor second BS list includes information on neighbor second BSs, and the neighbor second BSs are second BSs for which reference signals received by the MS have a signal strength measured by the MS equal to or greater than a threshold received signal strength, and wherein the neighbor second BS change probability is determined based on a neighbor second BS list generated at a first timing point and a neighbor second BS list generated at a second timing point, and the second timing point is a timing point before the first timing point.

32. The first BS of claim 31, further comprising a processor configured to:

upon detecting that there is a need for data distribution, determine whether the MS is located at a range within which a reception of a service from a second BS is possible based on measurement result information received from the MS;

if the MS is located at the range, determine whether the MS is possible that the reception of the service from the second BS based on the neighbor second BS change probability and a second BS suitable MS condition; and if the MS is possible that the reception of the service from the second BS, control the transceiver for transmitting, to the MS, a handover command message for a handover to the second BS, wherein the neighbor second BS change probability is used for determining a handover priority of the MS.

33. The first BS of claim 32, wherein the threshold received signal strength is set to one of a received signal strength that is necessary for providing a minimum service in a second BS, a received signal strength that is necessary for satisfying a data rate that the MS requires based on a second BS type, and a received signal strength detectable by the MS.

34. The first BS of claim 33, wherein the neighbor second BS change probability is determined based on a number of second neighbor second BS identifiers (IDs) per each second BS type included in the neighbor second BS list generated at the first timing point and a number of neighbor second BS IDs per each second BS type included in the neighbor second BS list generated at the second timing point.

35. The first BS of claim 32, wherein the processor is further configured to detect that there is the need for the data distribution if a load of the first BS is equal to or greater than a threshold load or if a resource allocation quantity per an MS does not require a resource quantity per an MS.

36. The first BS of claim 32, wherein the second BS suitable MS condition is determined based on the neighbor second BS change probability, and at least one of handover time, a scheduling period, running time, a neighbor second BS change probability comparing interval, a number of average neighbor second BS IDs included in the neighbor second BS list, and a margin.

37. The first BS of claim 31, wherein the transceiver is further configured to transmit a measurement indication message to the MS, wherein the measurement indication message includes at least one of measurement timing point information, a condition for neighbor second BSs corresponding to neighbor second BS identifiers (IDs) included in the neighbor second BS list, measurement result information, and measurement report timing point information, wherein the measurement timing point information denotes information on a timing point at which the MS performs a measurement operation, wherein the condition for the neighbor second BSs corresponding to the neighbor second BS IDs included in the neighbor second BS list denotes neighbor second BSs that have received signal strengths equal to or greater than the threshold received signal strength, wherein the measurement result information comprises performance results of the measurement operation including that the MS transmits, and wherein the measurement report timing point information comprises information on a timing point at which the MS performs a measurement report operation.

38. The first BS of claim 37, wherein the performance results of the measurement operation includes at least one of the neighbor second BS change probability, a second BS service indicator indicating whether the MS is suitable for receiving a service from a second BS, and the neighbor second BS list.

39. A second base station (BS) in a mobile communication system, the second BS comprising:

a processor configured to perform a handover operation to the second BS communicating a mobile station (MS); and a transceiver configured to transmit, to the MS, resource allocation information, wherein the handover operation is performed based on a neighbor second BS change probability and a neighbor second BS list, wherein the neighbor second BS list includes information on neighbor second BSs, and the neighbor second BSs are second BSs for which reference signals received by the MS have a signal strength measured by the MS equal to or greater than a threshold received signal strength, and wherein the neighbor second BS change probability is determined based on a neighbor second BS list generated at a first timing point and a neighbor second BS list generated at a second timing point, and the second timing point is a timing point before the first timing point.

40. The second BS of claim 39, wherein the transceiver is further configured to:

transmit, to the MS, the resource allocation information related to a service flow of the MS based on a first priority related to the service flow of the MS, the first priority is corresponding to a quality of service (QoS), wherein if the first priority is identical to a second priority related to a service flow of the other MS, the first priority is set to have a higher priority than the second priority based on the neighbor second BS change probability of the MS and a neighbor second BS change probability of the other MS, and wherein the neighbor second BS change probability of the MS is smaller than the neighbor second BS change probability of the other MS.

41. The second BS of claim 39, wherein the threshold received signal strength is set to one of a received signal strength that is necessary for providing a minimum service in a second BS, a received signal strength that is necessary for satisfying a data rate that the MS requires based on a second BS type, and a received signal strength that the MS can detect.

42. The second BS of claim 39, wherein the neighbor second BS change probability is determined based on a number of second neighbor second BS identifiers (IDs) per each second BS type included in the neighbor second BS list generated at the first timing point and a number of neighbor second BS IDs per each second BS type included in the neighbor second BS list generated at the second timing point.

* * * * *